(12) United States Patent
Li et al.

(10) Patent No.: US 12,529,414 B2
(45) Date of Patent: Jan. 20, 2026

(54) LINEAR DRIVING MECHANISM

(71) Applicants: AAC Acoustic Technologies (Shanghai) Co., Ltd., Shanghai (CN); Beijing Xiaomi Robot Technology Co., Ltd., Beijing (CN)

(72) Inventors: Chunjiang Li, Shanghai (CN); Yuntong Li, Shanghai (CN); Bing Xie, Shanghai (CN); Liang Jiang, Shanghai (CN); Chuiyou Zhou, Shanghai (CN)

(73) Assignees: AAC Acoustic Technologies (Shanghai) Co., Ltd., Shanghai (CN); Beijing Xiaomi Robot Technology Co., Ltd., Beijing (CN)

( * ) Notice: Subject to any disclaimer, the term of this patent is extended or adjusted under 35 U.S.C. 154(b) by 0 days.

(21) Appl. No.: 18/805,556

(22) Filed: Aug. 15, 2024

(65) Prior Publication Data
US 2025/0230862 A1      Jul. 17, 2025

Related U.S. Application Data

(63) Continuation of application No. PCT/CN2024/075269, filed on Feb. 1, 2024.

(30) Foreign Application Priority Data

Jan. 11, 2024   (CN) .......................... 202410046326.1

(51) Int. Cl.
*F16H 25/20*       (2006.01)
*F16H 25/22*       (2006.01)

(52) U.S. Cl.
CPC ..... *F16H 25/2252* (2013.01); *F16H 25/2015* (2013.01); *F16H 25/2204* (2013.01); *F16H 2025/2031* (2013.01); *F16H 2025/2078* (2013.01)

(58) Field of Classification Search
CPC ......... F16H 2025/2078; F16H 25/2252; F16H 2025/2075
See application file for complete search history.

(56) References Cited

U.S. PATENT DOCUMENTS

| | | | | |
|---|---|---|---|---|
| 5,099,161 | A * | 3/1992 | Wolfbauer, III | ........ F16H 25/20 310/80 |
| 10,859,143 | B2 * | 12/2020 | Chung | .................... F16H 25/20 |
| 12,181,027 | B2 * | 12/2024 | Knoell | .................... F16H 25/20 |

* cited by examiner

*Primary Examiner* — Gregory Robert Weber
(74) *Attorney, Agent, or Firm* — Wiersch Law Group

(57) ABSTRACT

The present invention provides a linear drive mechanism, including a housing, a front cover, a rear cover, a stator, and a rotor. The linear drive mechanism further includes a rolling lead screw, a first bearing, and a second bearing. The rolling lead screw includes a central lead screw and a lead screw nut. The rotor includes a hollow rotor body and an annular protrusion thereby driving the central lead screw to achieve linear telescopic motion. Compared with the prior art, the linear drive mechanism of the present invention has a good linear drive effect, which is convenient for reducing the length of the lead screw nut, saving costs, and saving installation space.

9 Claims, 4 Drawing Sheets

B-B

LINEAR DRIVING MECHANISM

TECHNICAL FIELD

The present invention relates to the field of linear drive technology, particularly to a linear driving mechanism.

BACKGROUND

The rapid development of the artificial intelligence and robotics industry is placing stricter requirements on linear actuators due to space, energy efficiency, and other demands. Linear actuators are moving towards higher integration, smaller volume, greater load capacity, and faster response. A linear drive mechanism is a type of linear actuator that uses a lead screw as the driving component, with a nut providing linear output. In other words, the nut does not rotate but moves in the axial direction for extension and contraction while the lead screw rotates.

In the relevant technologies, most standard type linear screw actuators adopt coaxial design. The motor connects to the extension shaft, the rotating shaft, and drives the nut to move axially forward or backward through gears or couplings. Alternatively, there are parallel drive mechanisms where the power source, such as an electric motor or internal combustion engine output torque, is transmitted to a parallel screw shaft via gears or belts. However, in the standard type planetary roller screw section, the screw shaft always acts as the driving part. If the electric motor serves as the power source, the electric motor rotor shaft and the planetary roller screw shaft are integrated together. The outer diameter of the motor is relatively large, and the nut of the planetary roller screw also has a certain size. These two parts are arranged in a series structure along the axis in space. For system safety, a housing must be installed to confine the outer diameter of the motor stator and the nut into a single shell, increasing the overall size of the planetary roller screw linear actuator.

Therefore, it is necessary to provide a new linear drive mechanism to solve the above technical problems.

SUMMARY

The purpose of the present invention is to provide a linear driving mechanism with good driving effect, which is easy to shorten the length of the screw and nut, save costs, and save installation space.

To achieve the above purposes, the present invention provides a linear drive mechanism comprising a housing; a front and a rear cover respectively fixed at opposite ends of the housing; a stator inside the housing; a hollow rotor; a first bearing sleeved in the rotor and fixed to one end of the rear cover; a second bearing sleeved on the rolling lead screw and fixed inside the housing; and a rolling lead screw sleeved in the rotor. The rolling lead screw includes a central screw rod set on an inner peripheral side of the rotor and passing through the front cover, a screw nut extending axially along the rotor and being fixed inside the second bearing and sleeved on the central screw rod for forming a rotational connection.

The rotor includes a hollow rotor body with an end away from the front cover fixed on the first bearing, and an annular protrusion protruding along an outer periphery of the rotor body close to the front cover. The protrusion is fixed on one end of the screw nut near the rear cover; the rotor rotates to drive the screw nut to rotate, thereby driving the central screw rod for performing linear telescopic movement.

As an improvement, the rolling lead screw is a planetary rolling lead screw. The screw nut comprises a first nut body with a threaded structure, a first bearing stop formed on an outer circumference of the first nut body, a plurality of first mounting grooves and second mounting grooves formed by concave portions at both ends of an inner wall of the first nut body, a first gear ring fixed in the first mounting groove, a second gear ring fixed in the second mounting groove, and a plurality of annular screw columns surrounding the central screw rod. Each end of each annular screw column is respectively set in the first gear ring and the second gear ring and forms a rotating connection. The first nut body is fixed in the second bearing; the first bearing stop abuts against the second bearing near one side of the rear cover; the protrusion is fixed in the first mounting groove and abuts against the first gear ring; the central screw rod includes a first central screw rod body set inside the rotor and provided with a threaded structure, and a first protruding end extending from one end of the first central screw rod body near the front cover. The first central screw rod body meshes with each of the annular screw columns, and each annular screw column meshes with the first nut body, and the first protruding end passes through the front cover.

As an improvement, the rolling lead screw is a ball screw rod. The screw nut comprises a second nut body, a first ball groove threaded on the inner peripheral side of the second nut body, a second bearing stop formed on the outer peripheral side of the second nut body, a third mounting groove recessed from one end of the second nut body away from the front cover, and a plurality of balls set inside the first ball groove. The second nut body is set inside the second bearing, and the second bearing stop abuts the second bearing on the side close to the rear cover; the central spindle includes a second central spindle body arranged inside the rotor and a second protruding end formed by the second central spindle body near the front cover; the second helical ball groove formed by the outer peripheral recess of the second central spindle body, corresponding to the first ball groove, and the balls are sandwiched between the first ball groove and the second ball groove to form a rolling connection between the second central spindle body and the second nut body.

As an improvement, the linear drive mechanism further comprises a stop block sleeved on the threaded rod nut, wherein the stop block abuts one side of the second bearing near the front cover.

As an improvement, a diameter of the rotor is smaller than a diameter of the screw nut.

As an improvement, the rotor further comprises a core fixedly mounted on the rotor body and a plurality of permanent magnets fixed to the core, each permanent magnet being spaced apart from the stator.

As an improvement, the linear drive mechanism further comprises a position sensor, wherein the position sensor comprises a collection part fixed to the rear cover and a rotating part fixed to the rotor, and the collection part is spaced apart from the rotating part.

As an improvement, the motor formed by the stator and the rotor together adopts an 8-pole-9-slot, 10-pole-12-slot structure, or 14-pole-12-slot structure, or 16-pole-12-slot structure.

As an improvement, the position sensor is a Hall position sensor, a magnetic encoding position sensor, or an optical encoding position sensor.

As an improvement, the linear drive mechanism further includes a base sleeve fixed to the rotor near the back cover side, wherein the rotating part is fixed to the base.

As an improvement, the linear drive mechanism further comprises a bearing housing, wherein the bearing housing is fixedly fitted to the first bearing, and an outer peripheral side of the bearing housing is fixedly connected to the inner wall of the housing.

Compared with existing technologies, in the linear drive mechanism of the present invention, the stator drives the rotor to rotate inside the housing, with the central screw rod set inside the rotor, the screw nut extending axially along the rotor, the screw nut fixed inside the second bearing, and the screw nut rotatably mounted on the central screw rod; the rotor includes a hollow rotor body and a convex platform radially extending from one end of the rotor body near the front cover, with the other end of the rotor body fixed to the first bearing, integrating the convex platform with the screw nut as a single structure, enabling the rotation of the rotor to drive the screw nut to rotate, thereby driving the central screw rod to achieve linear extension and retraction. By the installation of the first bearing and the second bearing, the screw nut does not undergo axial movement while the rotor rotates. As the rotor transmits torque to the central screw rod through the rotation of the screw nut, converting it into thrust, the central screw rod is driven to move axially due to the restriction of the screw nut from axial movement, achieving linear drive motion. Additionally, by fitting the rolling lead screw into the inner wall of the rotor, the length of the screw nut is effectively reduced, allowing independent processing of the screw nut and simplifying the manufacturing process. Furthermore, cost savings and installation space are conserved.

BRIEF DESCRIPTION OF THE DRAWINGS

In order to more clearly explain the technical solutions in the embodiments of the present application, the following will briefly introduce the drawings required in the embodiments or exemplary technical descriptions. Obviously, the drawings in the following description are only for the application. In some embodiments, for those of ordinary skill in the art, without paying any creative labor, other drawings may be obtained based on these drawings, in which.

DETAILED DESCRIPTION OF THE EMBODIMENTS

The following will be taken in conjunction with the accompanying drawings of embodiments of the present invention, The technical scheme in the embodiment of the invention is clearly and completely described, Obviously, the described embodiments are merely part of the embodiments of the present invention, and not all embodiments are based on the embodiments of the present invention, and all other embodiments attained by those of ordinary skill in the art without inventive effort are within the scope of the present invention.

First Embodiment

Figure 1:
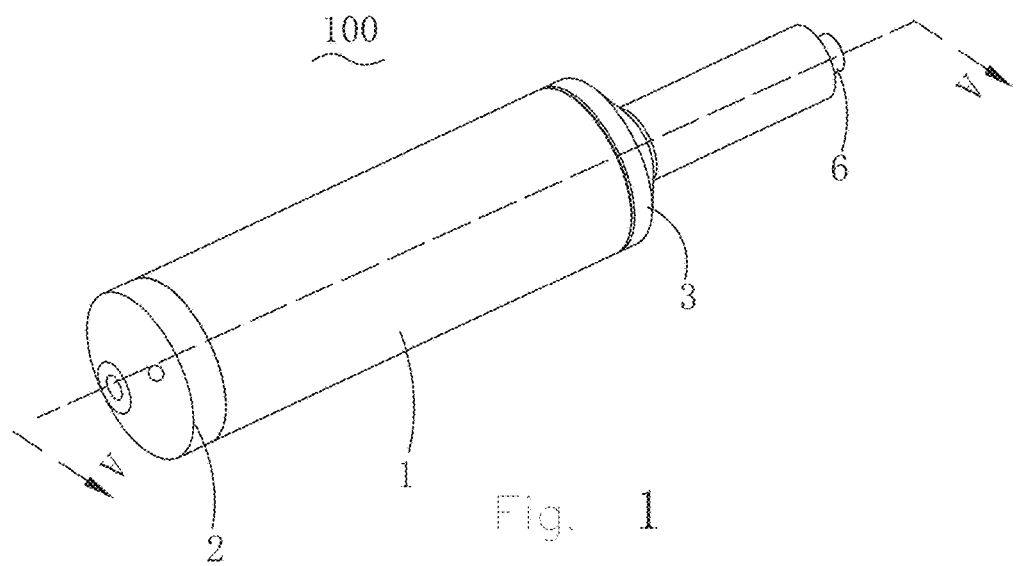
FIG. 1 is an isometric view of a linear drive mechanism in accordance with a first embodiment of the present invention.
Figure 2:
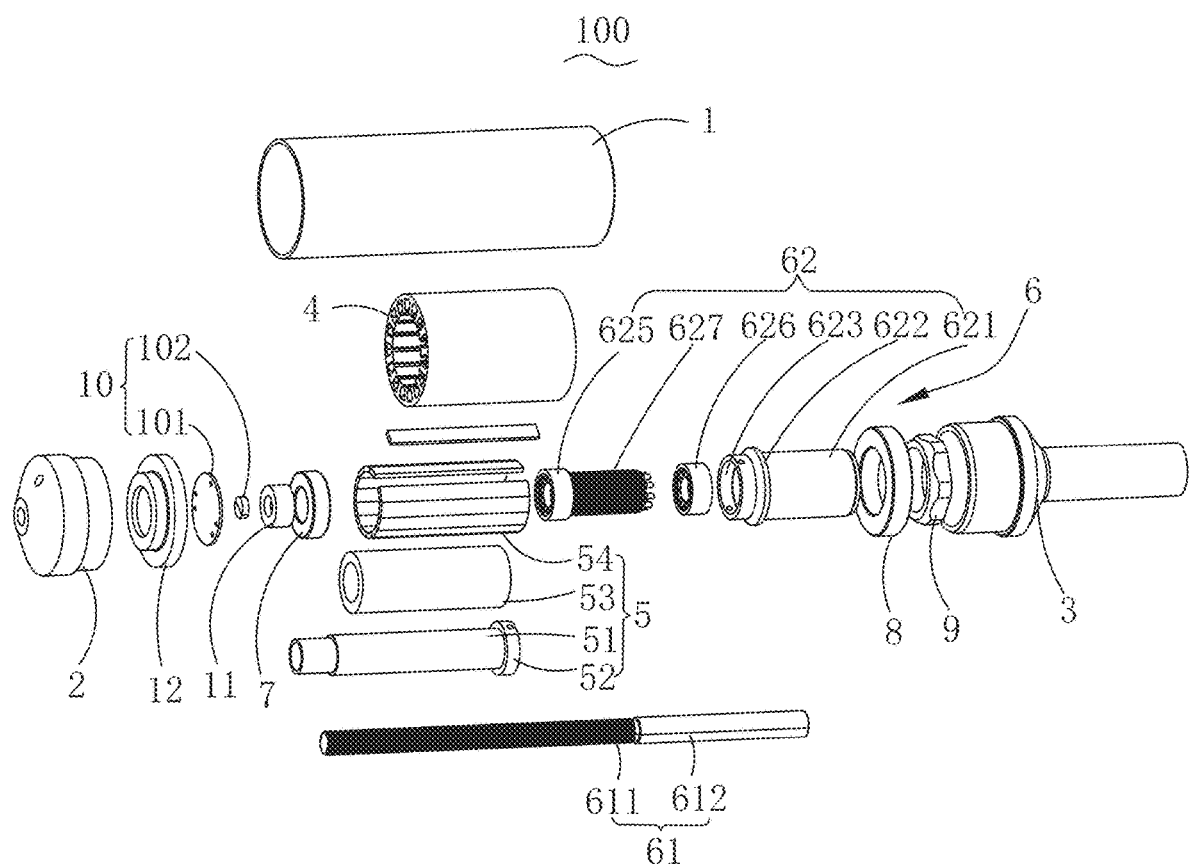
FIG. 2 is an exploded view of the linear drive mechanism in FIG. 1.
Figure 3:
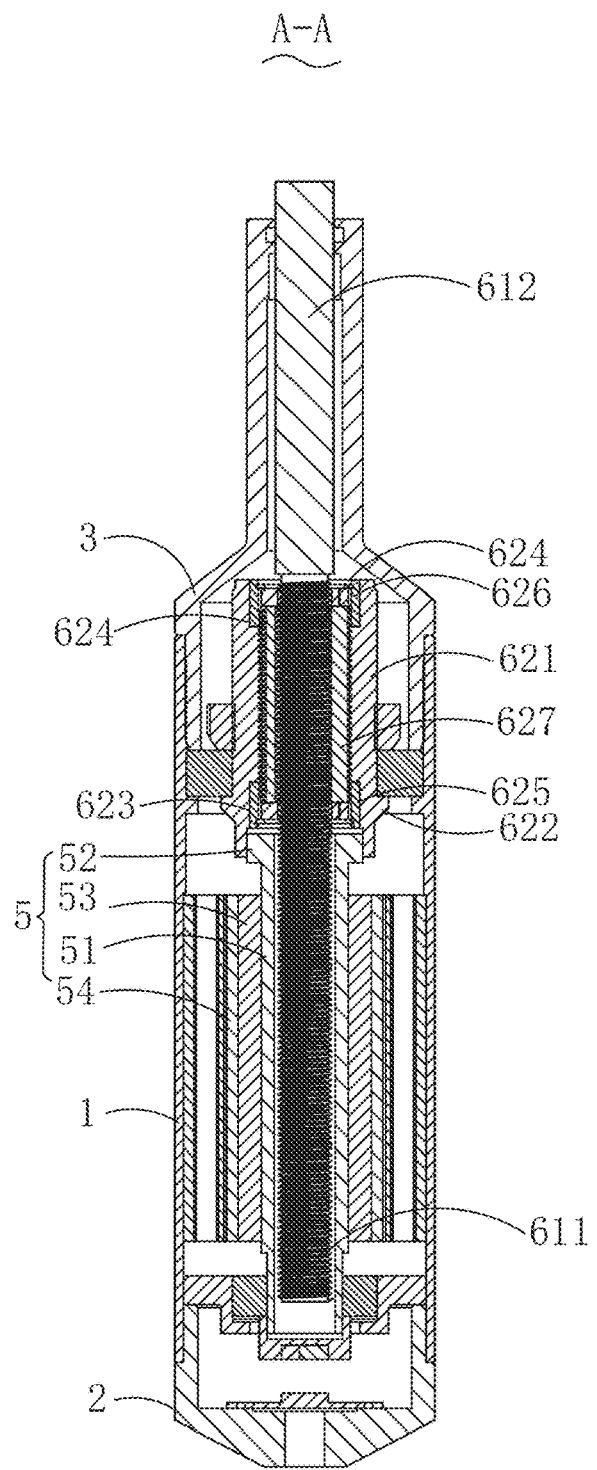
FIG. 3 is a cross-sectional view of the linear drive mechanism taken along line A-A in FIG. 1.

Based on FIGS. 1-3, the present invention provides an embodiment of a linear drive mechanism 100, comprising a housing 1, front cover 3 and rear cover 2 fixed respectively at the opposite ends of the housing 1, a stator 4 arranged inside the housing 1, and a hollow rotor 5 arranged inside the stator 4 and rotatably connected to the stator 4; the linear drive mechanism 100 further includes a rolling lead screw 6 sleeved on the rotor 5, a first bearing 7 sleeved on the rotor 5 and fixed to the rear cover 2, and a second bearing 8 sleeved on the rolling lead screw 6 and fixed inside the housing 1.

This implementation method, the first bearing 7 is a deep groove ball bearing, the second bearing 8 is a four-point contact ball bearing or angular contact ball bearing, and the rolling lead screw 6 can be a planetary roller screw. By the first bearing 7 and the second bearing 8, the rolling lead screw 6 is radially and axially constrained, making it easier for the rolling lead screw 6 to achieve linear telescopic motion under the drive of the rotor 5.

The linear drive mechanism 100 further includes a bearing chamber 12, the bearing chamber 12 being fixedly provided with the first bearing 7, and the outer peripheral side of the bearing chamber 12 being fixedly connected to the inner wall of the housing 1. Facilitate the installation and fixation of the first bearing 7.

In this implementation, optionally, the front cover 3 and the back cover 2 can be removed and fixed at the two ends of the housing 1. Optionally, the front cover 3 can be snap-fitted or latched onto the housing 1, and the back cover 2 can be snap-fitted or latched onto the housing 1 for easy assembly.

Of course, the chassis 1 can also be securely connected to the front cover 3 and rear cover 2 through welding technology for a better fixing effect.

The rolling lead screw 6 comprises a central screw shaft 61 set on the inner peripheral side of the rotor 5 and penetrating the front cover 3, and a screw nut 62 extending axially along the rotor 5, the screw nut 62 being fixed within the second bearing 8 and being rotationally sleeved on the central screw shaft 61 to form a rotational connection with the central screw shaft 61.

The rotor 5 includes a hollow rotor body 51 and an annular protrusion 52 protruding along the outer periphery of the rotor body 51 near the front cover 3, the rotor body 51 is fixed at one end away from the front cover 3 to the first bearing 7, and the protrusion 52 is inserted and fixed at one end of the screw rod nut 62 near the rear cover 2. The rotor 5 rotates to drive the screw rod nut 62 to rotate, thereby causing the central screw rod 61 to achieve linear extension and contraction movement. Optionally, the protrusion 52 can be threadedly connected with the screw rod nut 62 to form an integral structure, or can be connected by a pin to form an integral structure. After connection, the rotor 5 and the screw rod nut 62 can rotate coaxially, and the screw rod nut 62 and the rotor 5 rotate synchronously as the driving part, and the central screw rod 61 moves in the axial direction.

Specifically, by driving the rotor 4 to rotate in the stator 1, the central screw rod 61 is set in the rotor 5, the screw nut 62 is axially arranged along the rotor 5 and fixed in the second bearing 8, and the screw nut 62 is rotatably sleeved on the central screw rod 61; the rotor 5 includes a hollow rotor body 51 and a protrusion 52 radially extending from one end of the rotor body 51 near the front cover 3, the rotor body 51 is fixed to the first bearing 7 at the end away from the front cover 3, the protrusion 52 is integrally formed with the screw nut 62, and the rotor 5 rotates to drive the screw nut 62 to rotate, thereby enabling the central screw rod 61 to achieve linear telescopic motion. By the installation of the first bearing 7 and the second bearing 8, the screw nut 62 does not undergo axial movement when the rotor 5 rotates, and the rotor 5 transmits torque to the central screw rod 61 through the rotation of the screw nut 62, converting it into thrust. Due to the restrictions on axial movement, as described in the interaction of forces, the central screw rod 61 will be driven to move axially, achieving the function of linear drive motion. At the same time, by installing the roller screw 6 on the inner wall of the rotor 5, the length of the screw nut 62 is effectively reduced, the screw nut 62 can be independently processed, simplifying the process and reducing processing difficulty. Furthermore, it saves costs, the overall central screw rod 61 has a large load-bearing capacity and saves installation space.

The implementation mode, the lead screw nut 62 comprises a first nut body 621 with a threaded structure, a first bearing stop 622 formed on the peripheral side of the first nut body 621, first mounting grooves 623 and second mounting grooves 624 formed by indentations at the inner walls of both ends of the first nut body 621, a first gear ring 625 fixedly disposed in the first mounting groove 623, a second gear ring 626 fixedly disposed in the second mounting groove 624, and several annular screw pillars 627 arranged around the central lead screw 61, each of the annular screw pillars 627 having both ends respectively disposed in the first gear ring 625 and the second gear ring 626 and forming a rotatable connection; the first nut body 621 is fixed in the second bearing 8, the first bearing stop 622 abuts on one side of the second bearing 8 near the rear cover 2; the convex platform 52 is fixed in the first mounting groove 623 and abuts on the first gear ring 625.

The central screw rod 61 comprises a first central screw rod body 611 set inside the rotor 5 and provided with a threaded structure, and a first protruding end 612 formed by the first central screw rod body 611 extending towards the front cover 3; the first central screw rod body 61 is respectively engaged with each annular screw column 627, each annular screw column 627 is engaged with the first nut body 621, and the first protruding end 612 passes through the front cover 3. Several annular screw columns 627 are mounted by the first gear ring 625 and the second gear ring 626 to engage with the first central screw rod body 611, several annular screw columns 627 are engaged with the first nut body 621, the rotor 5 is driven by the stator 4 to rotate, the first nut body 621 drives several annular screw columns 627 to rotate, thereby driving the central screw rod 61 to perform linear telescopic motion.

The linear drive mechanism 100 of the present implementation further includes a stop block 9 fixedly sleeved on the nut 62 of the screw rod, the stop block 9 abutting against one side of the second bearing 8 near the front cover 3. By being abutted against by the stop block 9 on one side of the second bearing 8, and abutted against by a locking bolt on the other end, the axial position of the nut 62 is constrained in the axial direction.

This implementation, the diameter of the rotor 5 is smaller than the diameter of the screw nut 62. Facilitates the installation of the rotor 5 near one end of the front cover 3 fixed inside one end of the screw nut 62, integrated assembly is convenient.

This implementation method, the rotor 5 also includes a core 53 fixedly provided on the rotor body 51 and several permanent magnets 54 fixed to the core 53, each permanent magnet 54 being spaced apart from the stator 4. By assembling the permanent magnet 54 on the core 53; optionally, the permanent magnet 54 is fixedly attached to the outer peripheral side of the core 53, or the permanent magnet 54 is embedded inside the core 53, and the permanent magnet 54 has a good fixing effect.

The linear drive mechanism 100 of the present implementation further includes a position sensor 10, wherein the position sensor 10 comprises a collecting part 101 fixed to the rear cover 2 and a rotating part 102 fixed to the rotor 5, with the collecting part 101 and the rotating part 102 being set at a relative distance. By the rotational movement of the rotating part 102 with the rotor 5, the angle and number of rotations of the rotating part 102 are collected by the collecting part 101, thus obtaining the corresponding extension distance of the central lead screw 61.

The motor formed by the stator 4 and the rotor 5 in this implementation adopts an 8-pole 9-slot structure, a 10-pole-12-slot structure, a 14-pole-12-slot structure, or a 16-pole-12-slot structure. For example, the 8-pole-9-slot structure is represented by 8 permanent magnet poles and 9 stator slots.

The position sensor 10 in this implementation is a Hall position sensor, magnetic encoder position sensor, or optical encoder position sensor.

The linear drive mechanism 100 of the present embodiment further includes a base 11 fixedly fitted on one side of the rotor 5 near the back cover 2, and the rotating part 102 is fixedly mounted on the base 11. By closing one end of the rotor 5 near the back cover 2 with the base 11 and installing the rotating part 102 inside the base 11, installation space is saved.

The lengths of the first central lead screw body 611 and the second central lead screw body 613 in this implementation are both greater than or equal to the length of the rotor 5.

In this implementation, by applying the linear actuator 100 to the limb joints of the robot for electrically driven linear actuators, the integration is high and the process is simplified.

Second Embodiment

Figure 4:
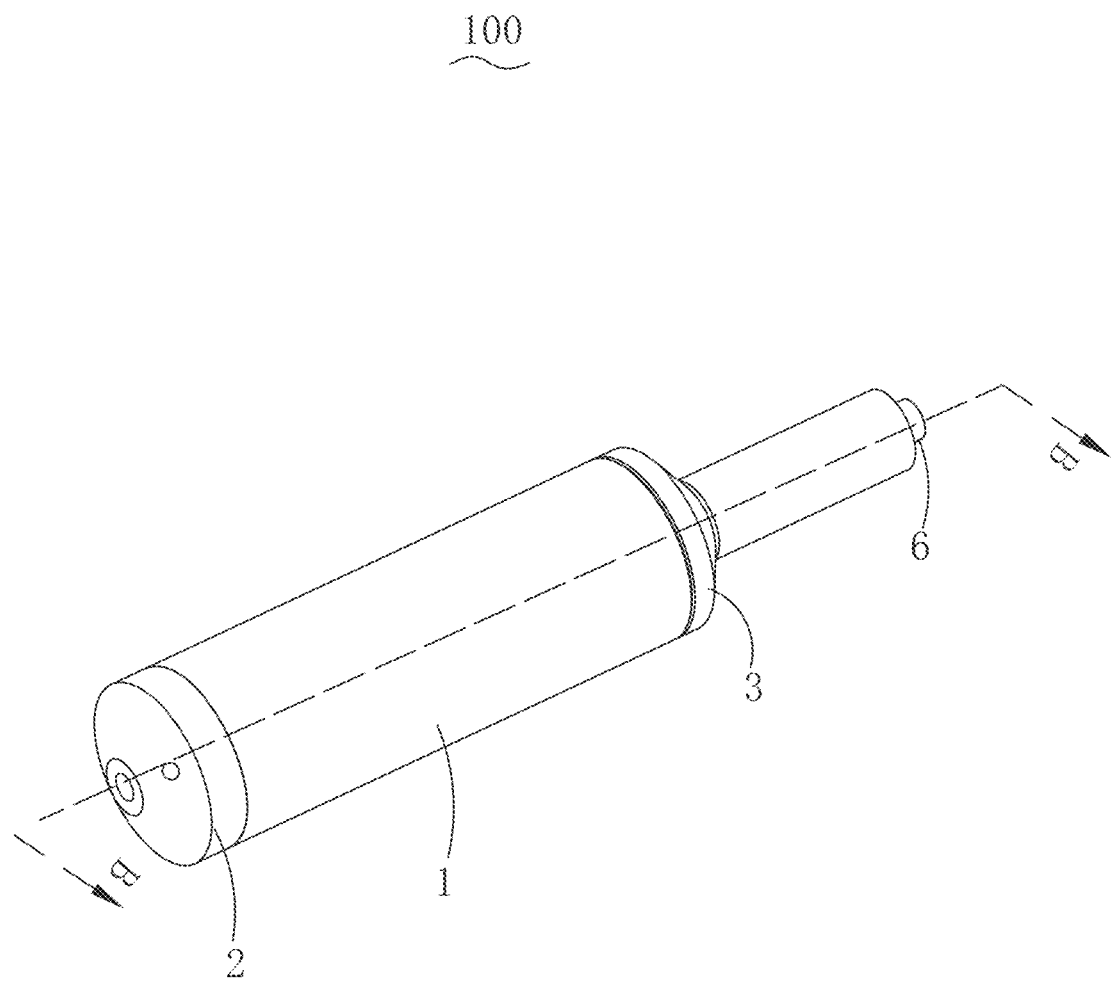
FIG. 4 is an isometric view of a linear drive mechanism in accordance with a second embodiment of the present invention.
Figure 5:
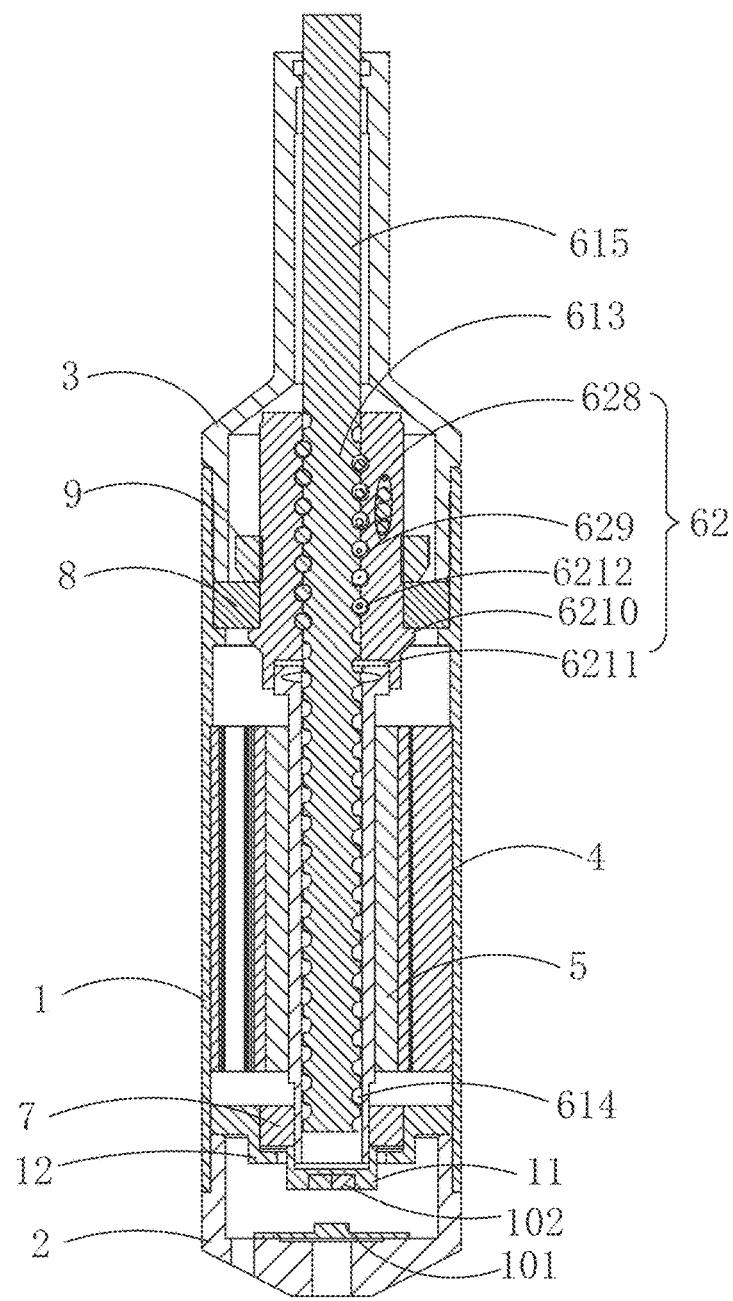
FIG. 5 is a cross-sectional view of the linear drive mechanism taken along line B-B in FIG. 4.

Referring to FIGS. 4-5, together with FIGS. 1-3, the basic structure and technical effects of the second embodiment are the same as those of the first embodiment. The difference lies in this embodiment, where the rolling lead screw 6 can be a ball screw. The screw nut 62 includes a second nut body 628, a thread-like first ball groove 629 formed on the inner peripheral side of the second nut body 628, a second bearing stopper 6210 formed on the outer peripheral side of the second nut body 628, a third mounting groove 6211 recessed from one end of the second nut body 628 away from the front cover 3, and several balls 6212 set in the first ball groove 629. The second nut body 628 is placed inside the second bearing 8, with the second bearing stopper 6210 abutting one side of the second bearing 8 near the back cover 2. The central screw rod 61 includes a second central screw rod body 613 inside the rotor 5 and a second extended end 615 extending from one end of the second central screw rod body 613 near the front cover 3. The outer peripheral groove of the second central screw rod body 613 forms a second ball groove 614, corresponding to the first ball groove 629, with the balls 6212 sandwiched between the first ball groove 629 and the second ball groove 614 to form a rolling connection between the second central screw rod body 613 and the second nut body 628. The linear expansion and contraction function is achieved by the connection of the second central screw rod 61 and the screw nut 62 through the balls 6212 transmitted by the ball grooves during the rotation of the rotor 5.

In this embodiment, by applying the linear actuator 100 to the robot's limb joints for electrically driven linear actuators, the integration is high and the process is simplified.

Compared with existing technologies, in the linear drive mechanism of the present invention, the stator drives the rotor to rotate inside the housing, with the central screw rod set inside the rotor, the screw nut extending axially along the rotor, the screw nut fixed inside the second bearing, and the screw nut rotatably mounted on the central screw rod; the rotor includes a hollow rotor body and a convex platform radially extending from one end of the rotor body near the front cover, with the other end of the rotor body fixed to the first bearing, integrating the convex platform with the screw nut as a single structure, enabling the rotation of the rotor to drive the screw nut to rotate, thereby driving the central screw rod to achieve linear extension and retraction. By the installation of the first bearing and the second bearing, the screw nut does not undergo axial movement while the rotor rotates. As the rotor transmits torque to the central screw rod through the rotation of the screw nut, converting it into thrust, the central screw rod is driven to move axially due to the restriction of the screw nut from axial movement, achieving linear drive motion. Additionally, by fitting the rolling lead screw into the inner wall of the rotor, the length of the screw nut is effectively reduced, allowing independent processing of the screw nut and simplifying the manufacturing process. Furthermore, cost savings and installation space are conserved.

The foregoing is merely illustrative of embodiments of the present invention, and it should be noted that modifications may be made to those skilled in the art without departing from the spirit of the invention but are intended to be within the scope of the invention.

What is claimed is:

1. A linear drive mechanism comprising:
   a housing;
   a front cover and a rear cover respectively fixed at opposite ends of the housing;
   a stator inside the housing;
   a hollow rotor;
   a first bearing sleeved in the rotor and fixed to one end of the rear cover;
   a second bearing sleeved on the rolling lead screw and fixed inside the housing;
   a rolling lead screw sleeved in the rotor, including a central screw rod set on an inner peripheral side of the rotor and passing through the front cover, a screw nut extending axially along the rotor and being fixed inside the second bearing and sleeved on the central screw rod for forming a rotational connection; wherein
   the rotor includes a hollow rotor body with an end away from the front cover fixed on the first bearing, and an annular protrusion protruding along an outer periphery of the rotor body close to the front cover; the protrusion is fixed on one end of the screw nut near the rear cover; the rotor rotates to drive the screw nut to rotate, thereby driving the central screw rod for performing linear telescopic movement; wherein a diameter of the rotor is smaller than a diameter of the screw nut; the rolling lead screw is a planetary rolling lead screw; the screw nut comprises a first nut body with a threaded structure, a first bearing stop formed on an outer circumference of the first nut body, a plurality of first mounting grooves and second mounting grooves formed by concave portions at both ends of an inner wall of the first nut body, a first gear ring fixed in the first mounting groove, a second gear ring fixed in the second mounting groove, and a plurality of annular screw columns surrounding the central screw rod; each end of each annular screw column is respectively set in the first gear ring and the second gear ring and forms a rotating connection;
   the first nut body is fixed in the second bearing; the first bearing stop abuts against the second bearing near one side of the rear cover; the protrusion is fixed in the first mounting groove and abuts against the first gear ring; the central screw rod includes a first central screw rod body set inside the rotor and provided with a threaded structure, and a first protruding end extending from one end of the first central screw rod body near the front cover; the first central screw rod body meshes with each of the annular screw columns, and each annular screw column meshes with the first nut body, and the first protruding end passes through the front cover.

2. The linear drive mechanism as described in claim 1, further comprising a stop block sleeved on the screw nut, wherein the stop block abuts one side of the second bearing near the front cover.

3. The linear drive mechanism as described in claim 1, wherein the rotor further comprises a core fixedly mounted on the rotor body and a plurality of permanent magnets fixed to the core, each permanent magnet being spaced apart from the stator.

4. The linear drive mechanism as described in claim 1, further comprising a position sensor, wherein the position sensor comprises a collection part fixed to the rear cover and a rotating part fixed to the rotor, and the collection part is spaced apart from the rotating part.

5. The linear drive mechanism as described in claim 4, wherein the position sensor is a Hall position sensor, a magnetic encoding position sensor, or an optical encoding position sensor.

6. The linear drive mechanism as described in claim 4, further including a base sleeve fixed to the rotor near the back cover side, wherein the rotating part is fixed to the base sleeve.

7. The linear drive mechanism as described in claim 1, wherein the motor formed by the stator and the rotor together adopts an 8-pole-9-slot, 10-pole-12-slot structure, or 14-pole-12-slot structure, or 16-pole-12-slot structure.

8. The linear drive mechanism as described in claim 1, further comprising a bearing housing, wherein the bearing housing is fixedly fitted to the first bearing, and an outer peripheral side of the bearing housing is fixedly connected to the inner wall of the housing.

9. A robot, comprising limb joints and the linear drive mechanism as described in claim 1 applied to the limb joints.

* * * * *